(12) United States Patent
Sheehan et al.

(10) Patent No.: US 8,783,354 B2
(45) Date of Patent: Jul. 22, 2014

(54) APPARATUS AND METHOD FOR ADJUSTING SPRING PRELOAD IN A DOWNHOLE TOOL

(75) Inventors: Mark Sheehan, Edmonton (CA); Jonathan Prill, Edmonton (CA); Jeffery Clausen, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 277 days.

(21) Appl. No.: 13/295,350

(22) Filed: Nov. 14, 2011

(65) Prior Publication Data
US 2012/0118641 A1    May 17, 2012

Related U.S. Application Data

(60) Provisional application No. 61/414,252, filed on Nov. 16, 2010.

(51) Int. Cl.
*E21B 31/107* (2006.01)
(52) U.S. Cl.
USPC ........... 166/301; 166/178; 175/296; 175/302; 175/303; 175/304; 175/293

(58) Field of Classification Search
CPC ..................................................... E21B 31/107
USPC ......... 175/296, 302, 303, 304, 293, 299, 399, 175/321; 166/178, 301; 173/92, 220, 165; 74/89.23, 89.25, 88
See application file for complete search history.

(56) References Cited

U.S. PATENT DOCUMENTS

| 2,903,241 | A | * | 9/1959 | Brown ........................... 175/303 |
| 4,624,315 | A | * | 11/1986 | Dickson et al. ............... 166/323 |
| 5,156,211 | A | | 10/1992 | Wyatt |
| 6,988,551 | B2 | | 1/2006 | Evans |
| 7,311,149 | B2 | | 12/2007 | Evans |
| 2006/0169456 | A1 | | 8/2006 | Evans |

* cited by examiner

*Primary Examiner* — Jennifer H Gay
*Assistant Examiner* — George Gray
(74) *Attorney, Agent, or Firm* — Conley Rose, P.C.

(57) ABSTRACT

Apparatus and method for adjusting spring preloading in a downhole tool. In an apparatus, a mechanism includes a nut and a piston. The nut is configured to axially compress a spring in the downhole tool. The piston is coupled to the nut. Extension of the piston causes the nut to rotate and compress the spring. The nut is configured to maintain compression of the spring after the piston retracts.

32 Claims, 9 Drawing Sheets

APPARATUS AND METHOD FOR ADJUSTING SPRING PRELOAD IN A DOWNHOLE TOOL

CROSS-REFERENCE TO RELATED APPLICATION

The present application claims priority to U.S. Provisional Patent Application No. 61/414,252, filed on Nov. 16, 2010; which is hereby incorporated herein by reference.

BACKGROUND

Various tools used in the drilling of wellbores (i.e., downhole tools) include a spring as an operative component of the tool. A mechanical jar is one such tool, and is used to free equipment stuck in a borehole by delivery of an upward or downward axial blow. A jar typically includes an inner mandrel and an outer housing telescopically coupled together for relative axial sliding movement. The mandrel carries a hammer and the housing carries an anvil By directing the hammer to impact the anvil at high velocity a substantial jarring force is imparted to stuck equipment, which is often sufficient to free the stuck equipment.

A typical mechanical jar includes a mechanical latch set to release at a pre-determined force. The hammer of the jar will remain securely locked in position until a force exceeding the latch setting is applied to the jar (e.g., by operation of the drawworks on the drill string). Thus, the latch prevents the jar from firing under normal drilling, tripping, or handling loads.

The latch mechanism of the jar includes an axially aligned stack of springs (e.g., disc or Belleville springs) whose compression may be adjusted by spacers to vary the latch setting. A stack of disc springs included in the latch mechanism will have a total height and associated spring rate that varies due to manufacturing tolerances and spring setting. Consequently, each spring assembly may require a different preload to achieve the precise latch setting that is desired. Conventionally, to set the preload, a number of spacers estimated to produce a desired latch setting are installed with the springs before the jar is completely assembled. The assembled jar is then tested on a jar tester where the tensile and compressive loads required to un-latch the jar are measured. If the latch settings are not as desired, the tool must be moved to a breakout machine, partially disassembled, and the spacers readjusted (i.e., spacers added or removed). Thereafter, the jar is reassembled, moved back to the jar tester and retested. Moving the downhole tool between machines for testing, and assembling and disassembling the tool to achieve the desired latch setting is costly and time consuming.

SUMMARY

Apparatus and method for adjusting spring preloading in a downhole tool are disclosed herein. In one embodiment, a mechanism for adjusting spring preloading in a downhole tool includes a nut and a piston. The nut is configured to axially compress a spring in the downhole tool. The piston is coupled to the nut. Extension of the piston causes the nut to rotate and compress the spring. The nut is configured to maintain compression of the spring after the piston retracts.

In another embodiment, a method for adjusting preloading of a spring in a downhole tool includes applying hydraulic pressure from outside the downhole tool to a piston disposed within the tool. The piston rotates along a helical path along the longitudinal axis of the tool responsive to the applied hydraulic pressure. A compression member coupled to the piston is extended responsive the rotation of the piston. The spring is compressed via the extension of the compression member.

In a further embodiment, a downhole tool for use in a borehole includes a spring and a spring adjustment mechanism. The spring is disposed along a longitudinal axis of the tool. The spring adjustment mechanism is longitudinally coaxial with the spring. The mechanism includes a hydraulically driven piston and a compression member. The compression member is configured to retainably compress the spring responsive to rotation of the piston. A cylindrical outer case is disposed about the spring and the spring adjustment mechanism. The case includes a first fluid port configured to provide pressurized fluid to the spring adjustment mechanism.

In yet another embodiment, an apparatus includes a tubular housing, a central tubular member, and a length-adjustable annular member. The central tubular member and the length-adjustable annular member are disposed within the housing. The length-adjustable annular member is disposed about the tubular member, and includes a sleeve, an annular piston, an annular torque transfer member, and a nut. The sleeve is disposed about the central tubular member and including a flange at a first end and a tubular portion extending from the flange to a second end. The tubular portion includes at least one helical slot formed in the wall of the tubular portion and includes a threaded segment. The annular piston, the torque-transfer member and the nut are disposed about the sleeve. The annular piston includes a first end adjacent the flange of the sleeve, indexing teeth at a second end, and a radial extension received within the helical slot of the sleeve. The annular torque-transfer member includes indexing teeth at a first end engaging the indexing teeth of the piston, and also includes a splined portion on its inner surface. The nut has a threaded inner surface threadingly engaging the threaded segment of the sleeve, and has outer splines engaging the splined inner surface of the torque-transfer member.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
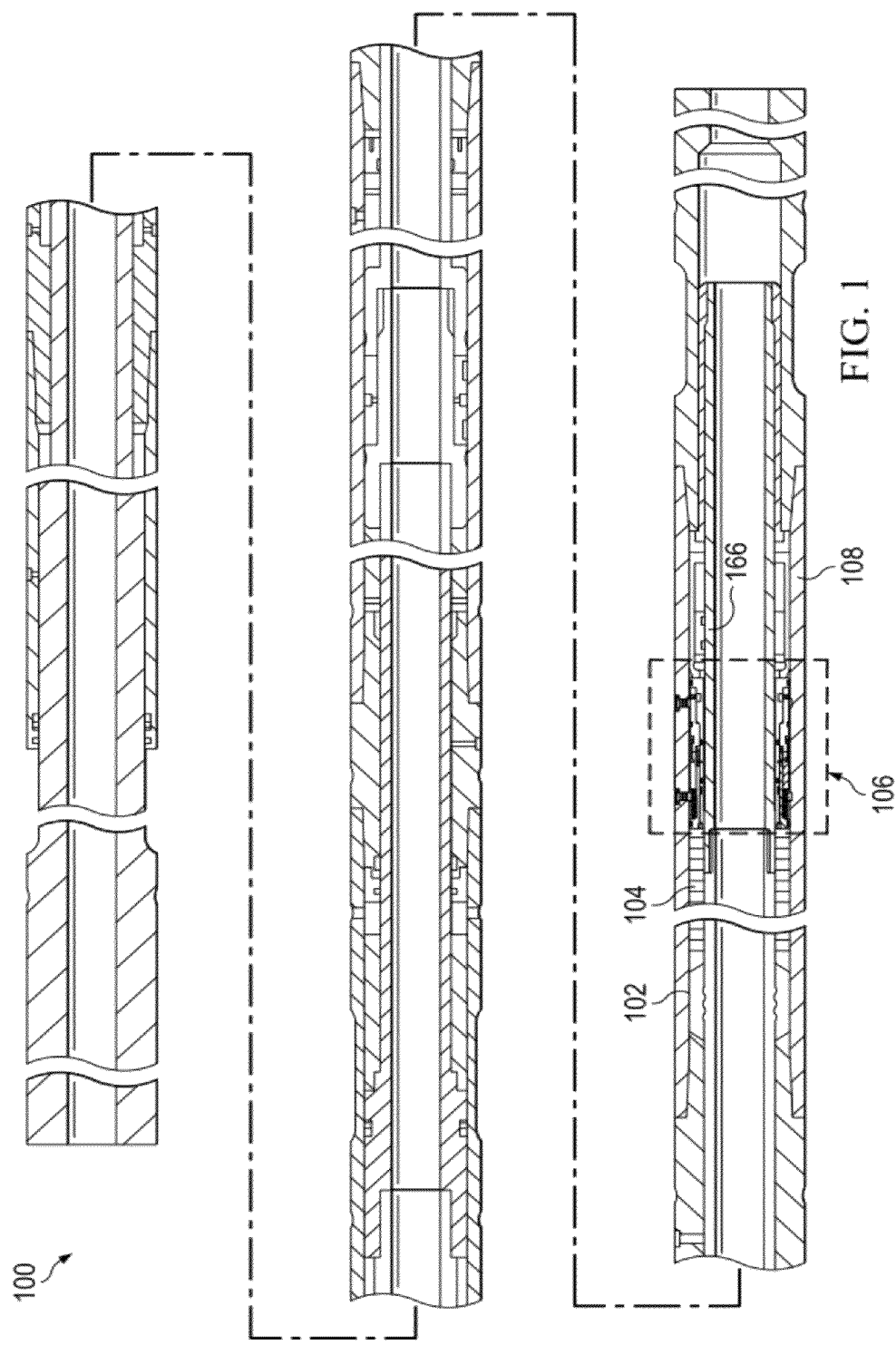
FIG. 1 shows a cross-section view of a jar including adjustable spring preload in accordance with various embodiments.

Embodiments of the present disclosure provide for alteration of spring preloading in downhole tools via a preload adjustment mechanism incorporated in the tool. The preload adjustment mechanism allows spring compression to be changed from outside the tool, and the mechanism can be operated with the tool fully assembled. FIG. 1 shows a jar 100 including adjustable spring preloading in accordance with various embodiments. The jar 100 includes a tubular outer housing 108, a latch 102, a spring 104, a spring preload adjustment mechanism 106, and a central tubular member 166. Preloading of the spring 104 by the preload adjustment mechanism 106 determines the force required to trigger the latch 102 and fire the jar 100. The preload adjustment mechanism 106 can be operated, with no disassembly of the jar 100, to vary the compression of the spring 104.

Figure 2:
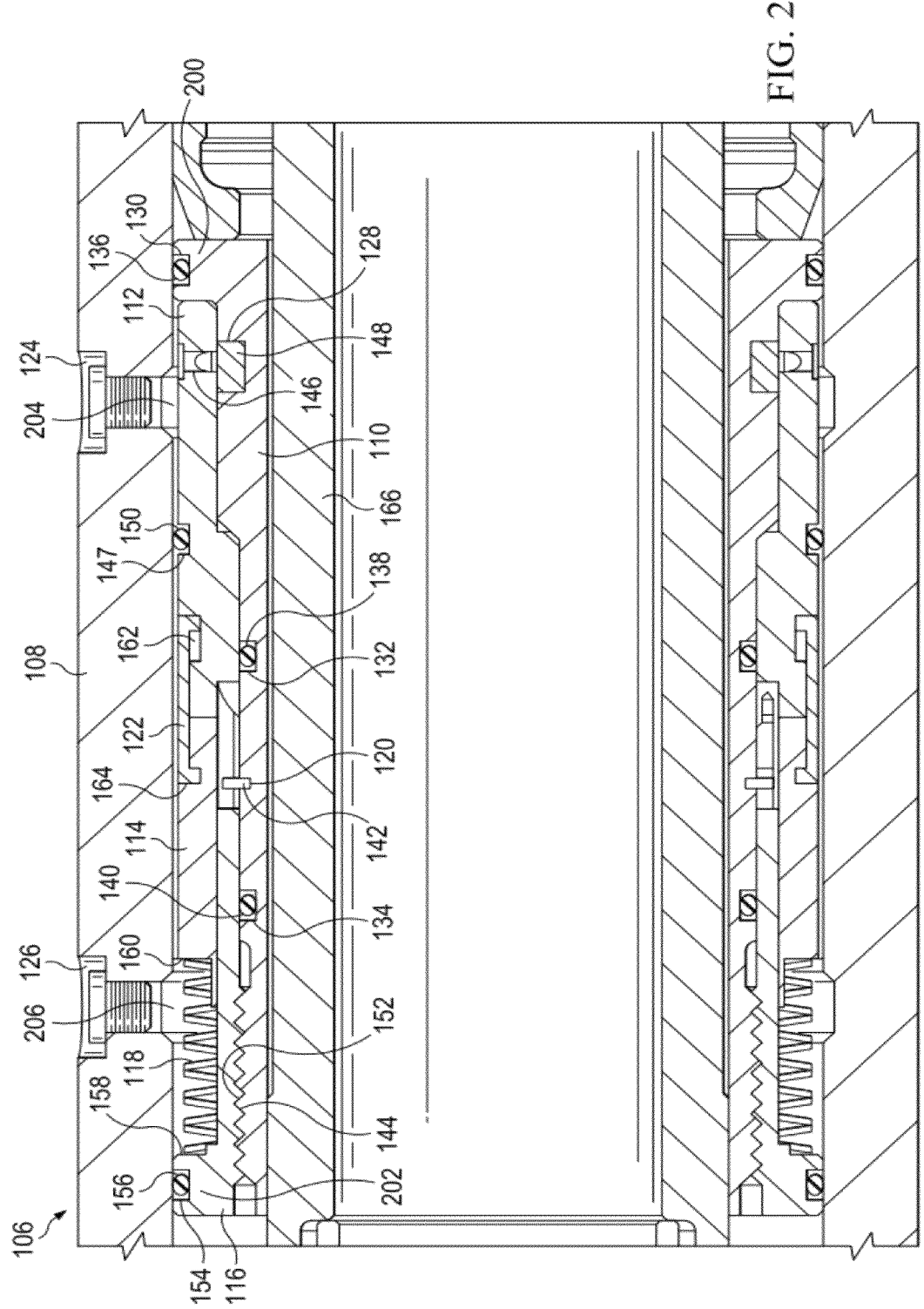
FIG. 2 shows a cross-section view of the spring preload adjustment mechanism of the jar in accordance with various embodiments.
Figure 8:
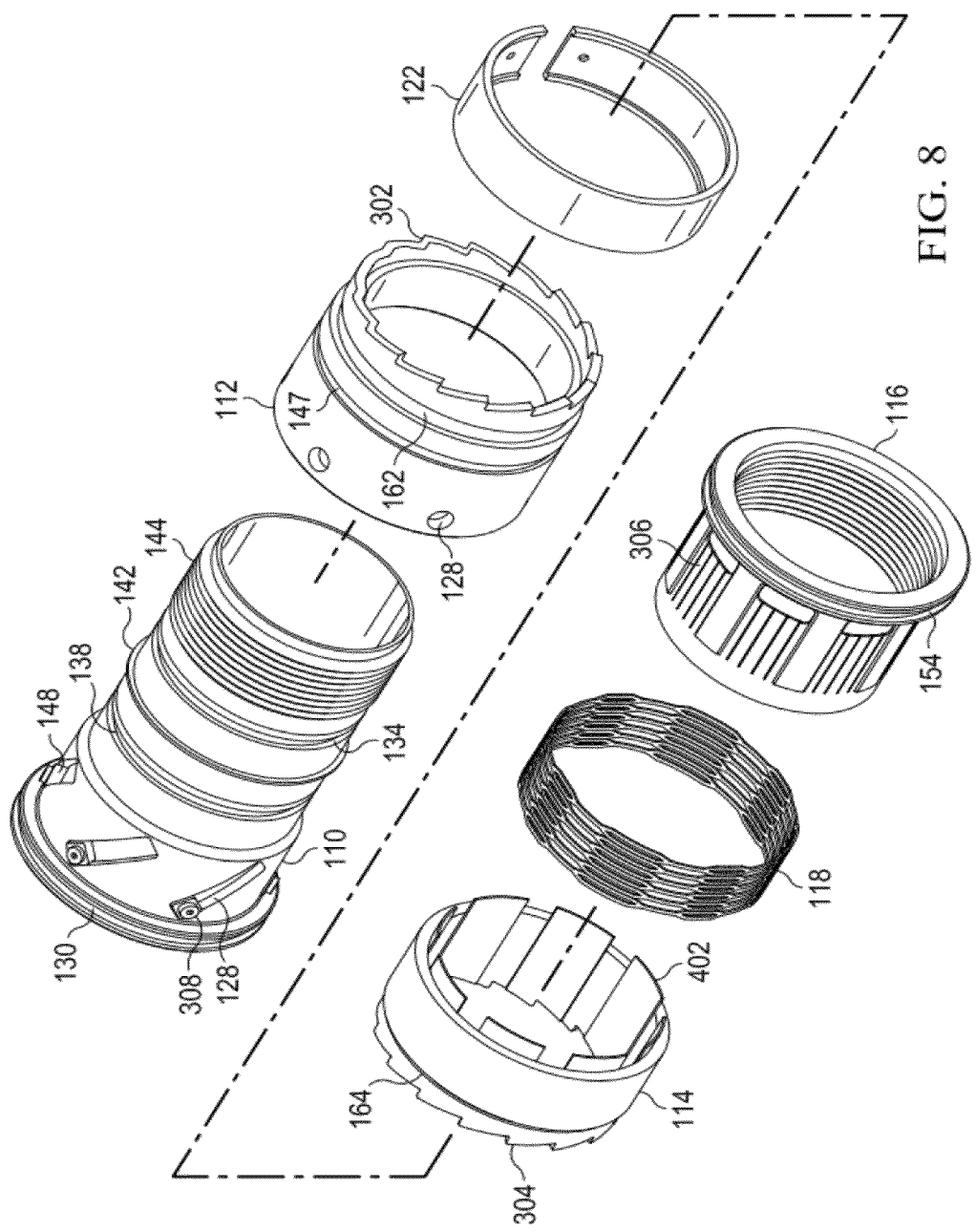
FIG. 8 shows an exploded view of the preload adjustment mechanism in accordance with various embodiments.
Figure 9:
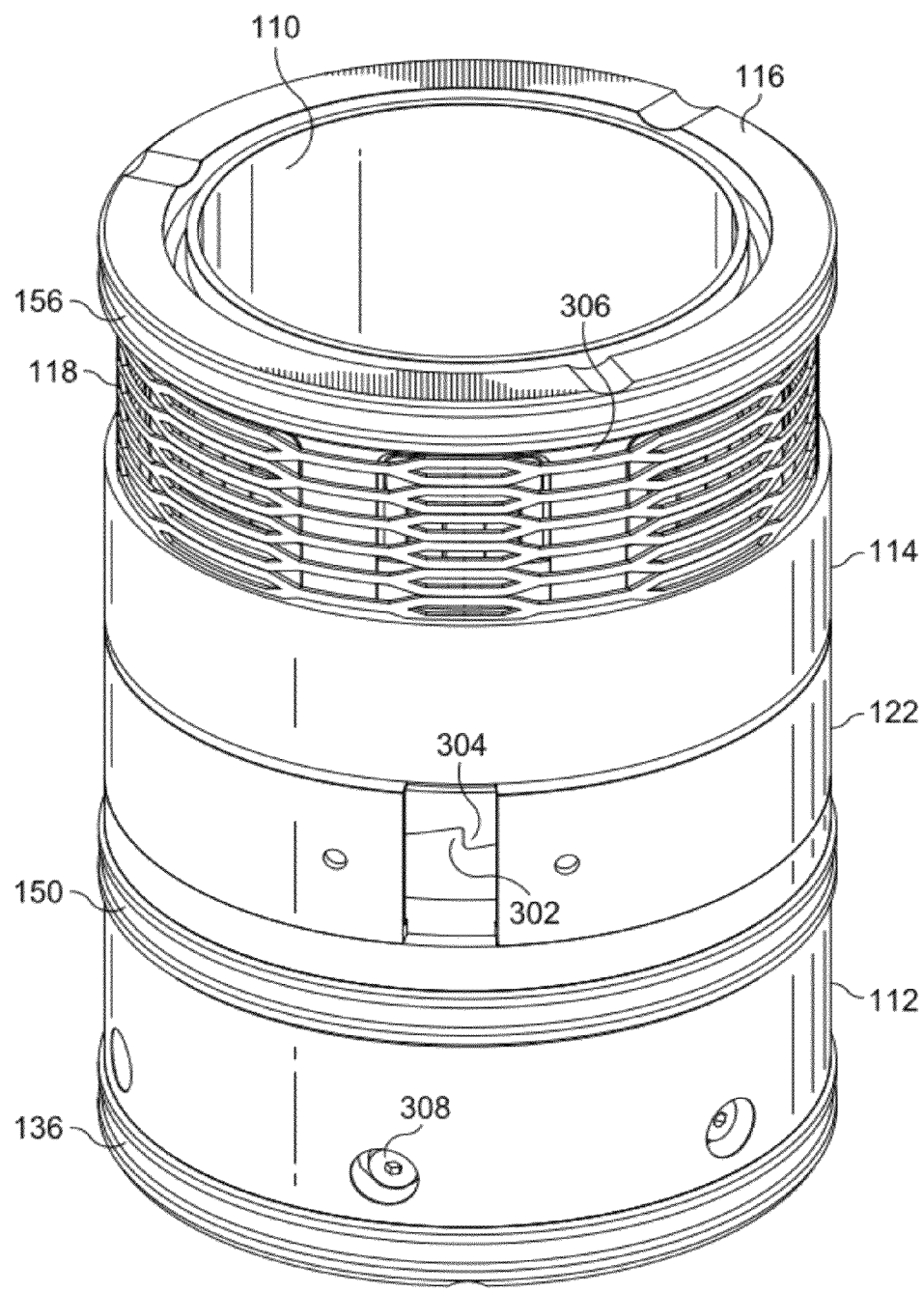
FIG. 9 shows a perspective view of an assembled preload adjustment mechanism in accordance with various embodiments.

Referring now to FIGS. 2 and 8, respectively showing longitudinal cross-section and exploded views, the preload adjustment mechanism 106 of the jar 100 is shown in greater detail. The mechanism 106 is a length adjustable annular assembly that includes a sleeve 110, a piston 112, a shuttle 114, and a nut 116. The sleeve 110 is generally tubular in shape and is radially dimensioned to fit within the piston 112, the shuttle 114, and the nut 116. The sleeve 110 includes a flange 200 at a first end of the sleeve, and a plurality of helical channels 128 formed in the tubular body of the sleeve adjacent the first end of the sleeve 110. As used herein, a helical channel refers to a channel in the wall of the sleeve 110 that is formed at an angle that is neither parallel to nor perpendicular to the longitudinal axis of the sleeve 110. Some embodiments of the sleeve 110 include six helical channels 128. The sleeve 110 also includes the annular channels 130, 132, and 134 for retaining annular seals (e.g., o-rings) 136, 138, and 140 respectively. The flange 200, in conjunction with the annular seal 136, seals the sleeve 110 against the inner surface of the housing 108. Annular seals 138 and 140 seal the sleeve 110 against the inner surfaces of the piston 112 and the nut 116 respectively. An annular groove 120 of the sleeve 110 is configured to receive a retaining ring 142. A second end of the sleeve 110 includes threads 144 for engagement with threads on the nut 116.

Figure 5:
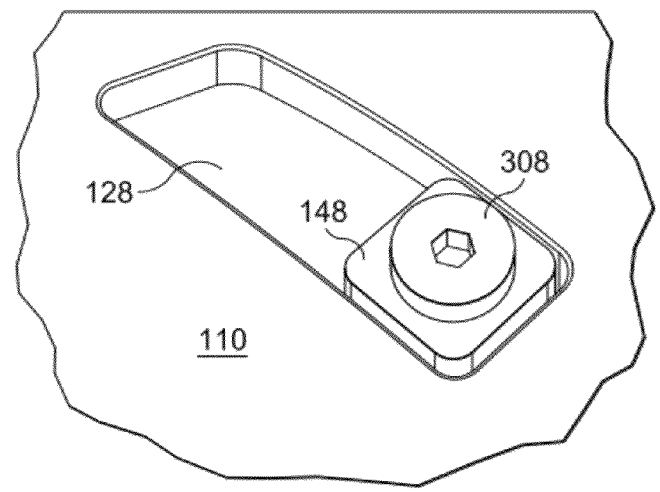
FIG. 5 shows a perspective view of a slider in the sleeve guide channel of the spring preload adjustment mechanism in accordance with various embodiments.

The piston 112, the shuttle 114 and the nut 116 are each generally cylindrical in shape and are radially dimensioned to encircle the sleeve 110. The piston 112 includes a plurality of holes 146 each corresponding to one of the helical channels 128 of the sleeve 110. A slider 148 is attached to the piston 112 via a fastener 308 inserted through each hole 146. In this manner each slider 148 forms a radial extension of the piston 112 FIG. 5 shows a view of the slider 148 in the helical channel 128 of the sleeve 110 (the wall of the piston 112 is not shown). Although the slider 148 is shown being generally rectangular in shape, the slider 148 may be other shapes, for example, round, in the shape of protruding pins, etc. Returning to FIG. 2, the piston 112 also includes an annular channel 147 for retaining annular seal 150 and an annular channel 162 for retaining the connecting ring 122. The annular seal 150 seals the piston 112 against the inner surface of the housing 108.

Figure 3:
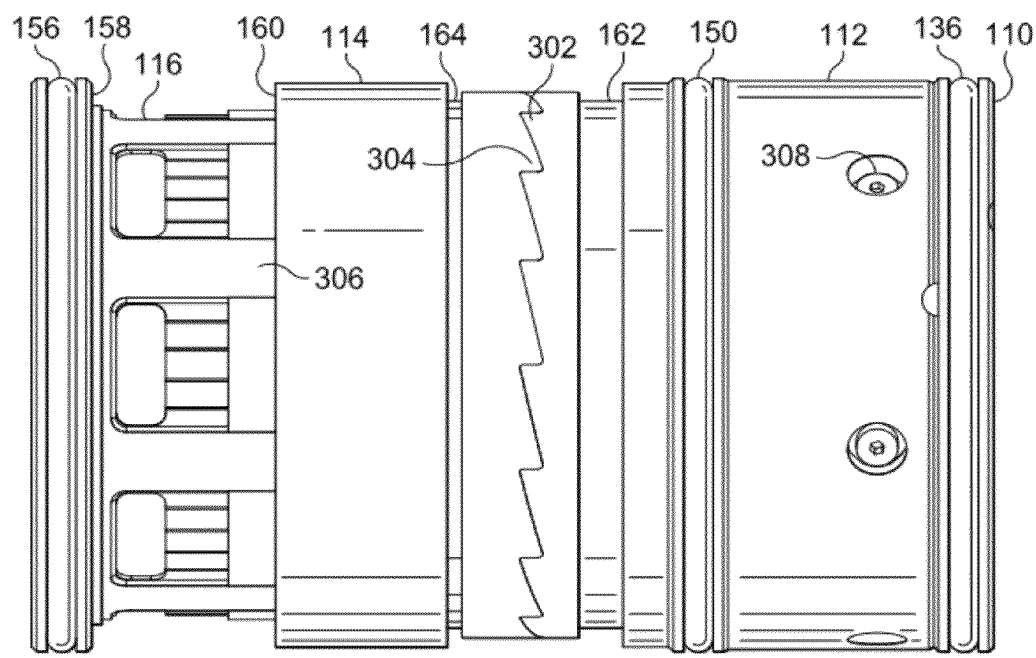
FIG. 3 shows a side elevation view of the sleeve, piston, shuttle, and nut of the spring preload adjustment mechanism in accordance with various embodiments.

Referring now to FIG. 3, the piston 112 includes a plurality of generally triangular index teeth 302 formed at the end of the piston 112 connecting with the shuttle 114.

Figure 4:
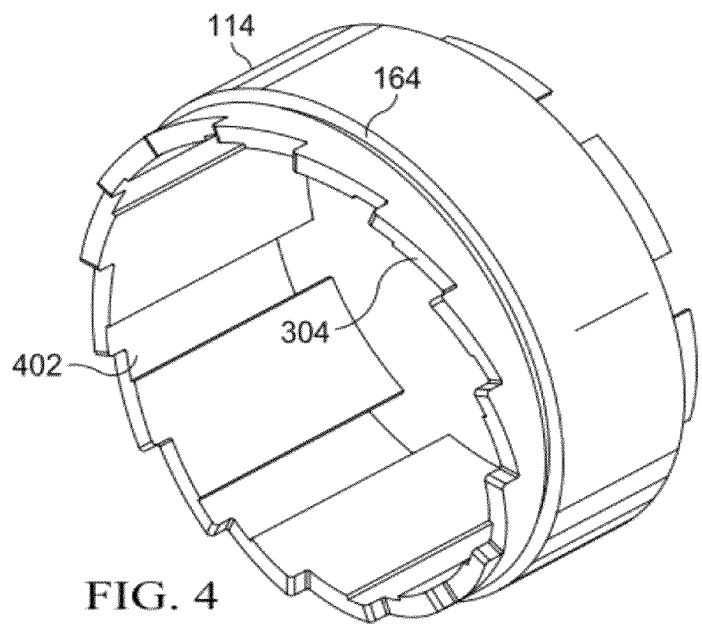
FIG. 4 shows a perspective view of the shuttle of the spring preload adjustment mechanism in accordance with various embodiments.

The shuttle 114 is a torque transfer mechanism, as explained in more detail below, for transferring torque from rotation of the piston 112 to the nut 116. The shuttle 114 includes a plurality of index teeth 304 that are configured to engage the teeth 302 of the piston 112. The shuttle 114 includes an annular channel 164 for retaining the connecting ring 122. The interior surface of the shuttle 114 includes splines 402, best shown in FIG. 4, for engaging the nut 116.

Referring again to FIG. 2, the nut 116 is disposed about the sleeve 110 and within the shuttle 114. The nut 116 includes a flanged portion 202, splines 306, and threads 152. The threads 152 are formed in the interior wall of the nut 116. The splines 306 are formed in the outer wall of the nut 116, as best shown in FIG. 3. The flanged portion 202 of the nut 116 includes an annular channel 154 for retaining annular seal 156. The flange 202, in conjunction with the annular seal 156, seals the nut 116 against the inner surface of the housing 108.

A spring 118 encircles the nut 116 between the shoulder 158 of the flange 202 of the nut 116 and the shoulder 160 of the shuttle 114 as shown in FIG. 2. The spring 118 may be wave spring, a coil spring, etc.

The connecting ring 122 is disposed in annular channels 162 and 164 of the piston 112 and the shuttle 114 respectively.

The piston 112, the shuttle 114, and the nut 116 are disposed about the sleeve 110, between the housing 108 and the sleeve 110, with the piston 112 disposed at the first end of the sleeve 110, the nut 116 disposed at the second end of the sleeve 110, and the shuttle 114 disposed between the piston 112 and the nut 116. The nut 116 is radially disposed between the sleeve 110 and the shuttle 114. The splines 306 of the nut 116 are engaged with the splines 402 of the shuttle 114. The threads 152 of the nut 116 are engaged with the threads 144 of the sleeve 110.

The piston 112 is helically extended along the sleeve 110 by hydraulic fluid injected through the port 124 into a chamber 204 formed by the annular seals 136, 138, and 150 (i.e., the "extension chamber"). The rotation of the piston 112 is transferred to the nut 116 through the shuttle 114. The rotation of the shuttle 114 unthreads the nut 116 from the sleeve 110 thereby increasing the length of the mechanism 106 and compressing the spring 104. The piston is returned to its initial position when the hydraulic pressure applied via the port 124 is relieved, by the force of the spring 118 and/or fluid pressure applied via the port 126 into a chamber 206 formed by the annular seals 156, 150, 140, and 138 (i.e., the "retraction chamber"). When the piston 112 and shuttle 114 are fully retracted, the fluid pressure at port 126 may be discontinued. The piston 112 is repetitively extended and retracted to unthread the nut 116 and expand the mechanism 106 until a desired compression of the spring 104 is achieved.

Figure 6:
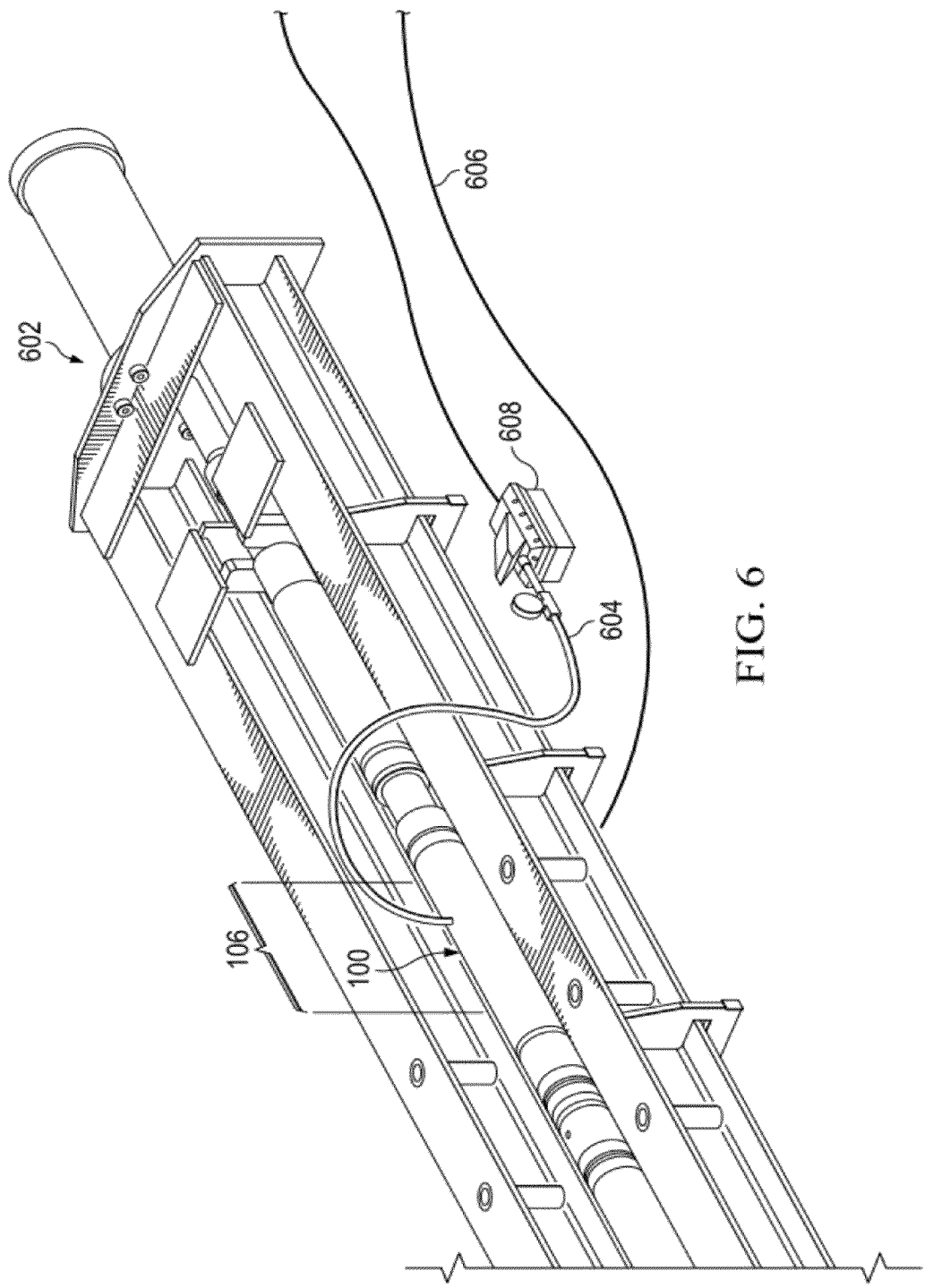
FIG. 6 shows the jar positioned in a test fixture for verification of jar operation and adjustment of spring preloading in accordance with various embodiments.

To operate the spring compression mechanism 106, the jar 100 may be positioned in a test fixture 602 as shown in FIG. 6 to verify the operation of the jar 100. Fluid lines 604, 606 connected to the jar 100 provide pressure for operating the spring compression mechanism 106. Initially, the spring compression mechanism 106 is arranged as shown in FIG. 2, with the piston 112 fully retracted (i.e., at it farthest point of travel towards the first end of the sleeve 100). The teeth 302 of the piston 112 are engaged with the teeth 304 of the shuttle 114. As hydraulic fluid is introduced into the spring compression mechanism 106 via the port 124 (e.g., by the pump 608), the pressure of the fluid in the chamber 204 forces the piston 112 to extend (i.e., to move towards the second end of the sleeve 110). As the piston 112 is extending, the camming engagement between the sliders 148 and the sides of the helical channels 128 cause the piston 112 to rotate. The helical motion of the piston 116 is transferred to the shuttle 114 via the teeth 302, 304 of the piston 112 and the shuttle 114. The longitudinal motion of the shuttle 114 compresses the retraction spring 118. The rotational motion of the shuttle 114 is transferred to the nut 116 via the splines 402, 306 of the shuttle 114 and the nut 116. The splines 402, 306 are mating projections and grooves that allow the shuttle 114 to move axially relative to the nut 116 while simultaneously allowing the shuttle 114 to rotate the nut 116. As the nut 116 rotates, it is unthreaded from the sleeve 110, thereby extending the length of the spring compression mechanism 106 and compressing the spring 104 of the jar 100.

Figure 7A:
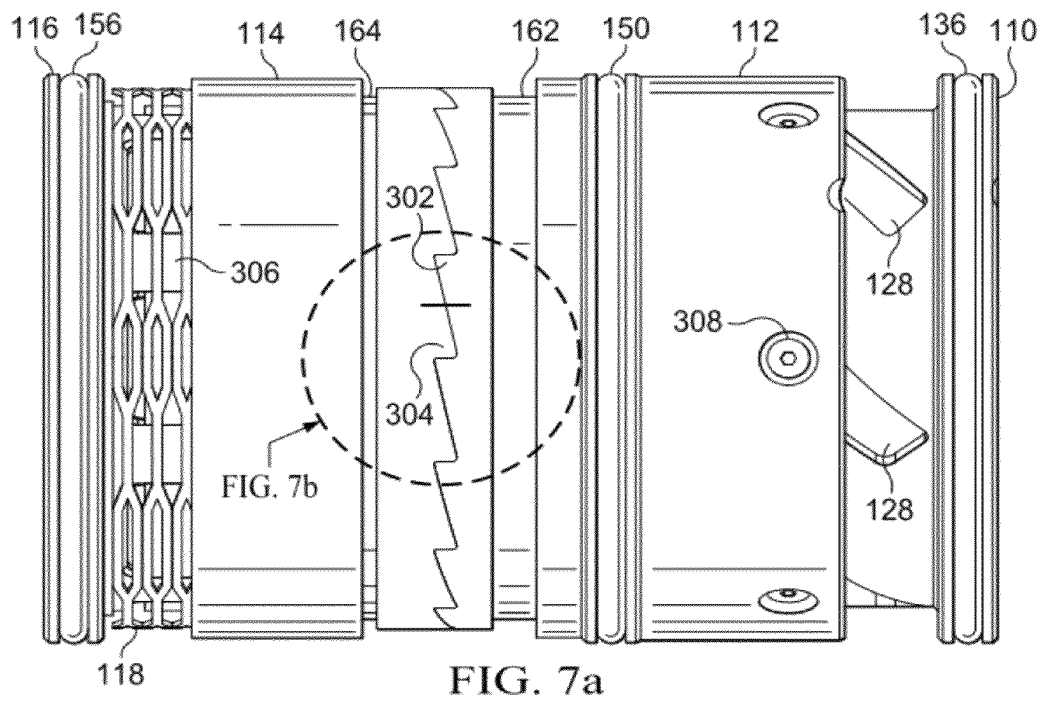
FIG. 7A shows a view of the spring load adjustment mechanism with the piston fully extended in accordance with various embodiments.

Longitudinal travel of the piston 112 is restricted by the retaining ring 142. When the piston 112 contacts the retaining ring 142, the piston 116 is fully extended as shown in FIG. 7A. In some embodiments, the piston 112 may travel approximately 0.6 inches longitudinally, and the length of the spring compression mechanism 106 may be extended by approximately 0.02 inches per stroke of the piston 112. In some embodiments, the distance of piston 112 rotation per stroke is defined by the length of the base of the triangular tooth 302.

Figure 7B:
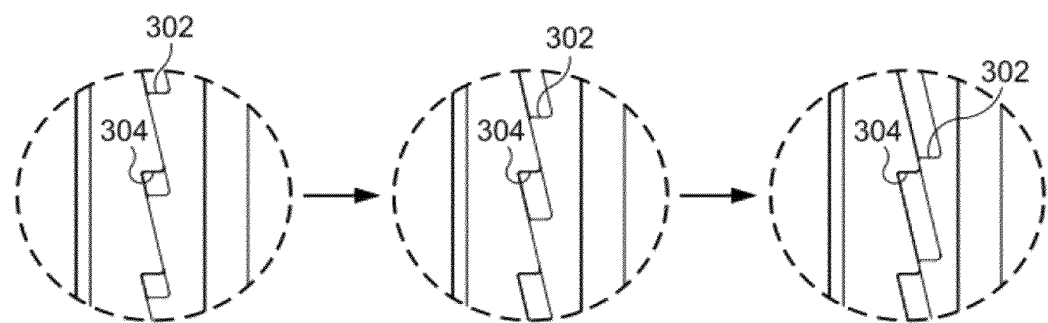
FIG. 7B shows disengagement of piston and shuttle teeth as the piston is retracted in accordance with various embodiments.
Figure 7C:
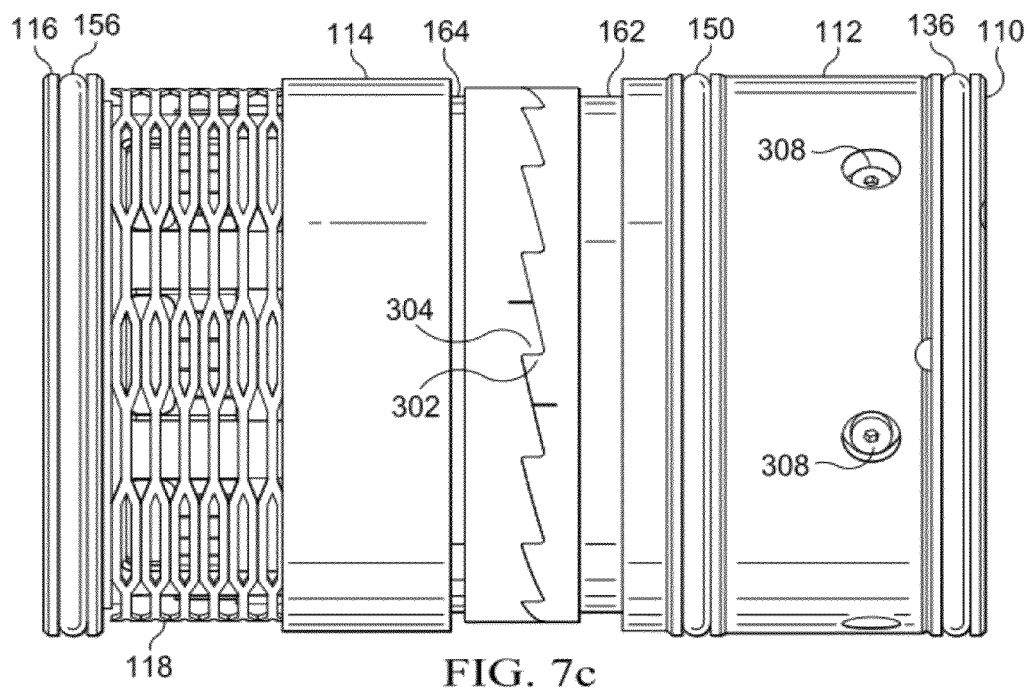
FIG. 7C shows indexing of piston and shuttle teeth when the piston is fully retracted in accordance with various embodiments.

To retract the piston 112, the hydraulic pressure applied via the port 124 is externally relieved. Absent this hydraulic pressure, the retraction spring 118 forces the shuttle 114 and the piston 112 back along the sleeve 110 towards their respective fully retracted positions. Retraction pressure may also be applied to the shuttle 114 and the piston 112 via fluid (e.g., air or liquid) supplied into the chamber 206 through the port 126. The nut 116 is coupled to the sleeve 110 via self-locking threads 152, 144 that inhibit rotation of the nut 116 and the shuttle 114 as the shuttle 114 and the piston 112 are retracted. The self-locking threads require that torque, rather than an axial force, be applied to rotate the nut 116. Torque is applied to the nut 116 as the piston 112 is extended, but no torque (or insufficient torque to cause rotation) is applied to the nut 116 as the piston 112 is retracted. Consequently, as shown in FIG. 7B, as the piston 112 is retracted along the helical path provided by the channels 128 of the sleeve 110, the teeth 302 of the piston 112 disengage from the teeth 304 of the shuttle 114 as the piston 112 rotates, and the nut 116 remains extended. As the piston 112 stroke ends, returning the piston 112 and the shuttle 114 to the fully retracted position as shown in FIG. 7C, the teeth 302, 304 fully disengage and index, mechanically locking the nut 116 in position. Each stroke of the piston 112 further extends the nut 116, allowing the spring 104 to be compressed as desired without disassembly of the jar 100.

The annular channel 162 in the piston 112 is wide enough to allow the teeth 302, 304 to disengage as the piston 112 and the shuttle 114 are retracted, while allowing the piston 112 to drag the shuttle 114 via the connecting ring 122 if the shuttle 114 sticks.

Figure 10:
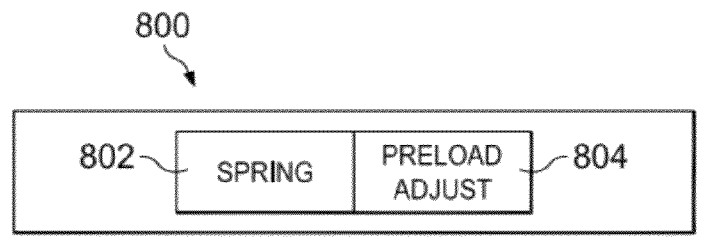
FIG. 10 shows a schematic view of a shock tool including a preload adjustment mechanism in accordance with various embodiments.

FIG. 10 shows a schematic view of a shock tool 800. Shock tools reduce the shock transferred to a drill string during a drilling operation as the drill bit bounces off the bottom of the borehole. The shock tool 800 includes a spring 802 and a preload adjustment mechanism 804. The spring 802 may be a stack of disc springs. The preload adjustment mechanism 804 may be the spring compression mechanism 106 as described herein. The preload adjustment mechanism 804 allows the compression of the spring 802 to be adjusted without disassembly of the shock tool 800 as described above with reference to the jar 100.

Figure 11:
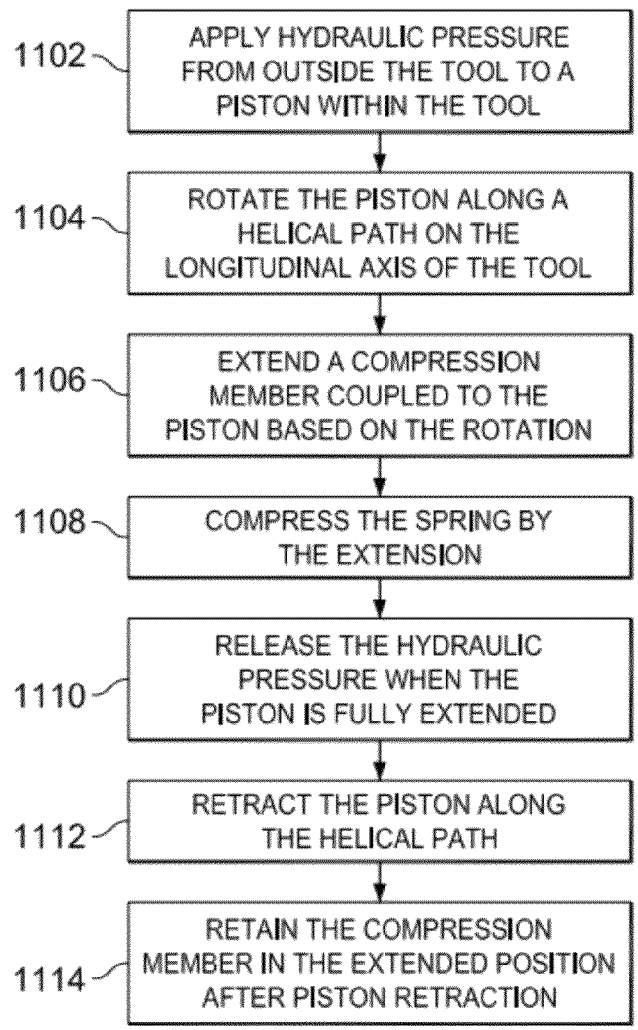
FIG. 11 shows a flow diagram for a method for adjusting spring preloading in a downhole tool in accordance with various embodiments.

FIG. 11 shows a flow diagram for a method for adjusting spring preloading in a downhole tool in accordance with various embodiments. Though depicted sequentially as a matter of convenience, at least some of the actions shown can be performed in a different order and/or performed in parallel. Additionally, some embodiments may perform only some of the actions shown.

In block 1102, a downhole tool that includes a spring 104 and a spring compression mechanism 106 as described herein is disposed for adjustment of the compression of the spring 104. For example, the downhole tool may be mounted in a test fixture that tests operation of the tool related to the spring 104 within the tool. To adjust the compression of the spring, a hydraulic fluid line is coupled to a fluid port 124 of the tool. Hydraulic fluid is applied from outside the tool, e.g., via the pump 608, into the chamber 204 within the tool. Pressurizing the chamber 204 applies axial force to the piston 112.

In block 1104, the hydraulic pressure causes the piston 112 to rotate in a helical path along the longitudinal axis of the tool. Thus, the piston moves both longitudinally and rotationally.

In block 1106, the rotation of the piston causes a compression member (i.e., the nut 116) coupled to the spring 104 to be extended. The compression member is extended by unthreading the compression member from a sleeve 110 to which the compression member is threadingly engaged. Full extension of the piston 112 may extend the compression member by a predetermined amount, such as fraction of an inch (e.g., a few one-hundredths of an inch).

In block 1108, the compression member (i.e., the nut 116) is coupled to the spring 104 and the extension of the compression member compresses the spring 104.

In block 1110, the piston 112 has reached the end of its travel path. To return the piston 112 to its initial position, the hydraulic pressure applied to the piston 112 via port 124 is released. When the pressure is released, force from a retraction spring 118 that was compressed by the extension of the piston 112 and/or force provided by fluid introduced into the chamber 206 (e.g., air) via the port 126 of the tool causes the piston 112 to retract along the helical path to its initial position in block 1112.

In block 1114, the compression member remains extended after the piston 112 is retracted to its initial position and maintains compression of the spring 104. The piston 112 may be repeatedly extended and retracted to increasingly extend the compression member and provide a desired amount of spring compression.

The above discussion is meant to be illustrative of the principles and various embodiments of the present invention. Numerous variations and modifications will become apparent to those skilled in the art once the above disclosure is fully appreciated. For example, while exemplary embodiments of the invention have been described with reference to a jar and shock tool, those skilled in the art will understand that embodiments are applicable to any downhole tool including a spring requiring preload adjustment. It is intended that the following claims be interpreted to embrace all such variations and modifications.

What is claimed is:

1. Apparatus for adjusting preloading in a downhole tool, the apparatus comprising:
    a nut configured to axially compress a spring in the downhole tool;
    a piston coupled to the nut, wherein extension of the piston causes the nut to rotate and compress the spring, and
    the nut is configured to maintain compression of the spring after the piston retracts;
    a tubular shuttle disposed between the piston and the nut, and
    a retraction spring disposed between the nut and the shuttle, the spring configured to retract the shuttle and the piston toward an initial position.

2. The apparatus of claim 1, wherein the piston and the shuttle are coupled via indexing teeth and rotation of the piston induces rotation of the shuttle via the teeth.

3. The apparatus of claim 1, further comprising a connecting ring connecting the shuttle and the piston, wherein the connecting ring is configured to allow the piston to drag the shuttle toward an initial position.

4. The apparatus of claim 1, wherein the shuttle and the nut comprise mating splines that rotationally couple the shuttle and the nut.

5. The apparatus of claim 1, further comprising a tubular ratchet sleeve disposed within the piston and the nut.

6. The apparatus of claim 5, wherein the extension of the piston causes helical rotation of the piston about the ratchet sleeve.

7. The apparatus of claim 5, wherein the ratchet sleeve comprises a helical channel, and wherein the piston comprises a slider member disposed within the channel to guide rotation of the piston.

8. The apparatus of claim 5, wherein the nut is threadingly coupled to the sleeve, and the extension of the piston unthreads the nut from the sleeve.

9. A method for adjusting preloading of a spring in a downhole tool, comprising:
    applying hydraulic pressure from outside the downhole tool to a piston disposed within the tool;
    rotating the piston along a helical path along the longitudinal axis of the tool responsive to the applied hydraulic pressure;
    extending a compression member coupled to the piston responsive to the rotation of the piston;
    compressing the spring via the extension of the compression member;
    discontinuing application of hydraulic pressure to the piston;
    retracting the piston along the helical path; and
    retainin the compression member in an extended position after he piston is retracted.

10. The method of claim 9, further comprising transferring the piston rotation to the compression member through a shuttle disposed between the piston and the compression member, wherein the shuttle toothedly engages the piston and splinedly engages the compression member.

11. The method of claim 10, wherein extending the compression member comprises unthreading the compression member from a tubular sleeve disposed within the compression member, the shuttle, and the piston.

12. The method of claim 9, wherein the retracting is responsive to force from at least one of a retracting spring coupled to the piston and fluid pressure applied to the piston from outside the downhole tool.

13. The method of claim 9, further comprising retracting a shuttle coupling the piston to the compression member along a linear path.

14. A downhole tool for use in a borehole, comprising:
    a spring disposed about a longitudinal axis of the tool;
    a spring adjustment mechanism longitudinally coaxial with the spring, the spring adjustment mechanism comprising:
        a hydraulically driven piston;
        a compression member configured to retainably compress the spring responsive to rotation of the piston; and
        a tubular sleeve, wherein the piston is disposed about one end of the sleeve and the compression member is disposed about another end of the sleeve; and
    a cylindrical outer case disposed about the spring and the spring adjustment mechanism, the case comprising a first fluid port configured to provide pressurized fluid to the spring adjustment mechanism.

15. The downhole tool of claim 14, wherein the sleeve comprises a helical channel configured to cause the piston to rotate as the hydraulic fluid moves the piston longitudinally along the sleeve.

16. The downhole tool of claim 14, wherein the compression member is threadingly coupled to the sleeve, and the compression member is configured to unthread from the sleeve responsive to the rotation of the piston.

17. The downhole tool of claim 14, wherein the spring adjustment mechanism further comprises a tubular shuttle disposed between the piston and the compression member, wherein the shuttle is configured to unidirectionally transfer piston rotation to the compression member.

18. The downhole tool of claim 17, wherein the shuttle comprises:
    longitudinal teeth at one end configured to engage matching longitudinal teeth of the piston, and
    splines at another end, the splines configured to couple to splines of the compression member.

19. The downhole tool of claim 14, wherein the spring adjustment mechanism further comprises a retraction spring configured to bias the piston toward an initial position when hydraulic pressure to the piston is discontinued.

20. The downhole tool of claim 14, further comprising a second fluid port configured to provide fluid to the spring adjustment mechanism, wherein the pressure of the fluid returns the piston toward an initial position when hydraulic pressure at the first port is discontinued.

21. The downhole tool of claim 14, wherein the tool is jar or a shock.

22. A downhole tool for use in a borehole, comprising:
a spring disposed about a longitudinal axis of the tool;
a spring adjustment mechanism longitudinally coaxial with the spring, the spring adjustment mechanism comprising:
   a hydraulically driven piston;
   a compression member configured to retainably compress the spring responsive to rotation of the piston; and
   a tubular shuttle disposed between the piston and the compression member, wherein the shuttle is configured to unidirectionally transfer piston rotation to the compression member, the shuttle comprising:
      longitudinal teeth at one end configured to engage matching longitudinal teeth of the piston, and
      splines at another end, the splines configured to couple to splines of the compression member; and
a cylindrical outer case disposed about the spring and the spring adjustment mechanism, the case comprising a first fluid port configured to provide pressurized fluid to the spring adjustment mechanism.

23. The downhole tool of claim 22, wherein the spring adjustment mechanism further comprises a tubular sleeve, wherein the piston is disposed about one end of the sleeve and the compression member is disposed about another end of the sleeve.

24. The downhole tool of claim 23, wherein the sleeve comprises a helical channel configured to cause the piston to rotate as the hydraulic fluid moves the piston longitudinally along the sleeve.

25. The downhole tool of claim 23, wherein the compression member is threadingly coupled to the sleeve, and the compression member is configured to unthread from the sleeve responsive to the rotation of the piston.

26. The downhole tool of claim 22, wherein the spring adjustment mechanism further comprises a retraction spring configured to bias the piston toward an initial position when hydraulic pressure to the piston is discontinued.

27. The downhole tool of claim 22, further comprising a second fluid port configured to provide fluid to the spring adjustment mechanism, wherein the pressure of the fluid returns the piston toward an initial position when hydraulic pressure at the first port is discontinued.

28. A downhole tool for use in a borehole, comprising:
a spring disposed about a longitudinal axis of the tool;
a spring adjustment mechanism longitudinally coaxial with the spring, the spring adjustment mechanism comprising:
   a hydraulically driven piston; and
   a compression member configured to retainably compress the spring responsive to rotation of the piston;
a cylindrical outer case disposed about the spring and the spring adjustment mechanism, the case comprising a first fluid port configured to provide pressurized fluid to the spring adjustment mechanism; and
a second fluid port configured to provide fluid to the spring adjustment mechanism, wherein the pressure of the fluid returns the piston toward an initial position when hydraulic pressure at the first port is discontinued.

29. The downhole tool of claim 28, wherein the spring adjustment mechanism further comprises a tubular sleeve, wherein the piston is disposed about one end of the sleeve and the compression member is disposed about another end of the sleeve, and the sleeve comprises a helical channel configured to cause the piston to rotate as the hydraulic fluid moves the piston longitudinally along the sleeve.

30. The downhole tool of claim 29, wherein the compression member is threadingly coupled to the sleeve, and the compression member is configured to unthread from the sleeve responsive to the rotation of the piston.

31. The downhole tool of claim 28, wherein the spring adjustment mechanism further comprises a tubular shuttle disposed between the piston and the compression member, wherein the shuttle is configured to unidirectionally transfer piston rotation to the compression member; wherein the shuttle comprises:
   longitudinal teeth at one end configured to engage matching longitudinal teeth of the piston, and
   splines at another end, the splines configured to couple to splines of the compression member.

32. The downhole tool of claim 28, wherein the spring adjustment mechanism further comprises a retraction spring configured to bias the piston toward an initial position when hydraulic pressure to the piston is discontinued.

* * * * *